United States Patent [19]

Matsuno et al.

[11] Patent Number: 5,149,186

[45] Date of Patent: Sep. 22, 1992

[54] VEHICLE ROOM FLOOR ILLUMINATING APPARATUS

[75] Inventors: Yoshio Matsuno; Shinichiro Choji, both of Machida; Kazuhiko Ito, Hirakata; Teruaki Shigeta, Neyagawa, all of Japan

[73] Assignees: Nissan Motor Co., Ltd., Yokohama; Matsushita Electric Industrial Co., Ltd., Osaka, both of Japan

[21] Appl. No.: 538,332

[22] Filed: Jun. 15, 1990

[30] Foreign Application Priority Data

Jun. 26, 1989 [JP] Japan .................. 1-164451

[51] Int. Cl.$^5$ .............................. B60Q 3/00
[52] U.S. Cl. .......................... 362/75; 362/80; 362/131; 362/276; 362/802; 315/77; 315/156
[58] Field of Search ............. 362/61, 80, 74, 75, 362/153, 131, 276, 802; 315/77, 156, 157, 158, 159

[56] References Cited

U.S. PATENT DOCUMENTS

| | | | |
|---|---|---|---|
| 2,587,371 | 2/1952 | Nettesheim | 362/153 |
| 2,635,681 | 4/1953 | Hiltman et al. | 362/131 |
| 2,783,365 | 2/1957 | Wilfert | 362/80 |
| 2,882,450 | 4/1959 | McCabe | 315/158 |
| 4,217,628 | 8/1980 | Windom | 362/131 |
| 4,231,082 | 10/1980 | Bull | 362/80 |
| 4,236,101 | 11/1980 | Luchaco | 315/156 |
| 4,368,406 | 1/1983 | Kruzich et al. | 315/77 |
| 4,388,558 | 6/1983 | Mizuno et al. | 315/77 |
| 4,670,819 | 6/1987 | Boerema et al. | 362/80 |
| 4,794,373 | 12/1988 | Harrison | 362/153 |

FOREIGN PATENT DOCUMENTS 818525  8/1959  United Kingdom .................. 362/75

*Primary Examiner*—Stephen F. Husar
*Attorney, Agent, or Firm*—Foley & Lardner

[57] ABSTRACT

At least one first foot lamp is disposed on the lower surface of the instrument panel at a height roughly the same as that of the front seat cushion so as to illuminate a front floor before the front seat and a middle floor under the front seat. Further, at least one second foot lamp is disposed on the rearmost and downmost position of the front seat cushion, so as to further illuminate the middle floor under the front seat and a rear floor before the rear seat. Since the vehicle room floor is illuminated brighter than that of the upper room space, the passengers' eyes usually see the vehicle floor the farthest away from the passenger's eyes. Therefore, they feel that the vehicle is broad and roomy and can easily pick up an object on the floor.

7 Claims, 5 Drawing Sheets

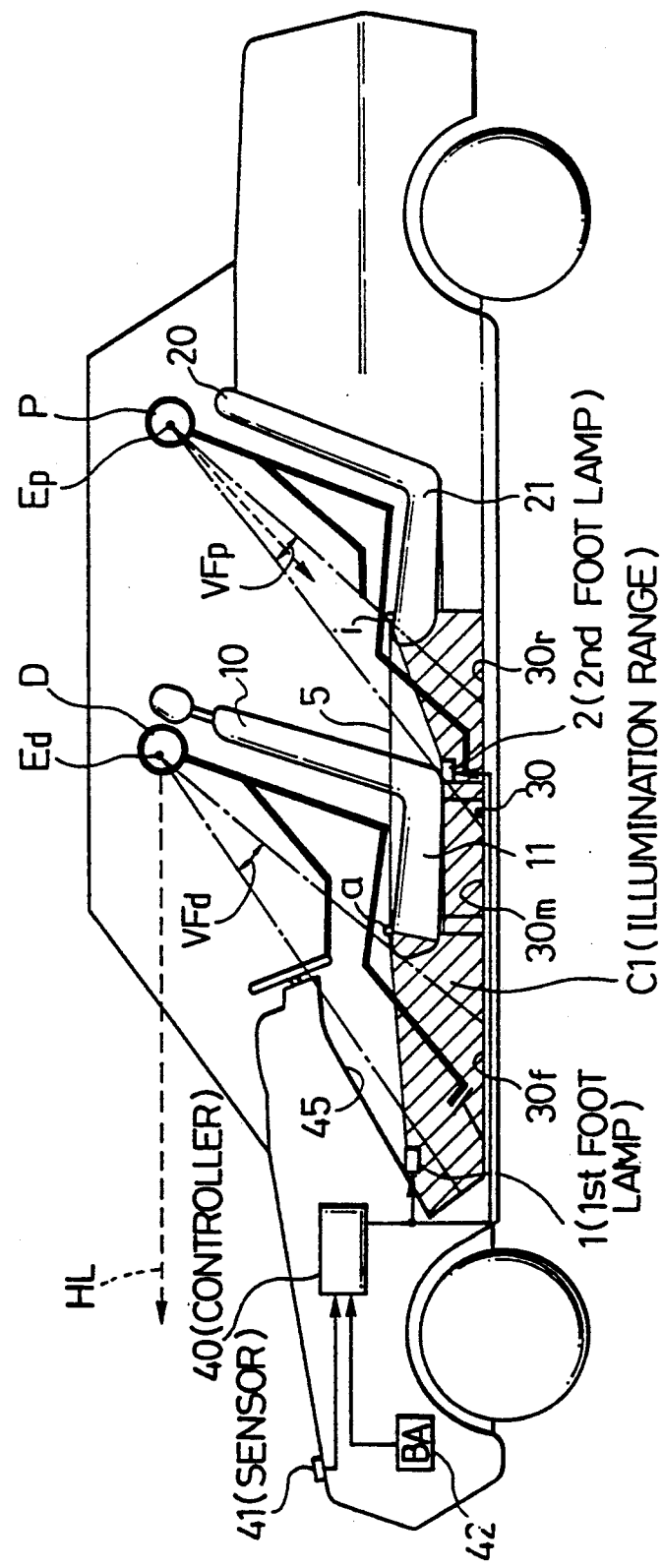

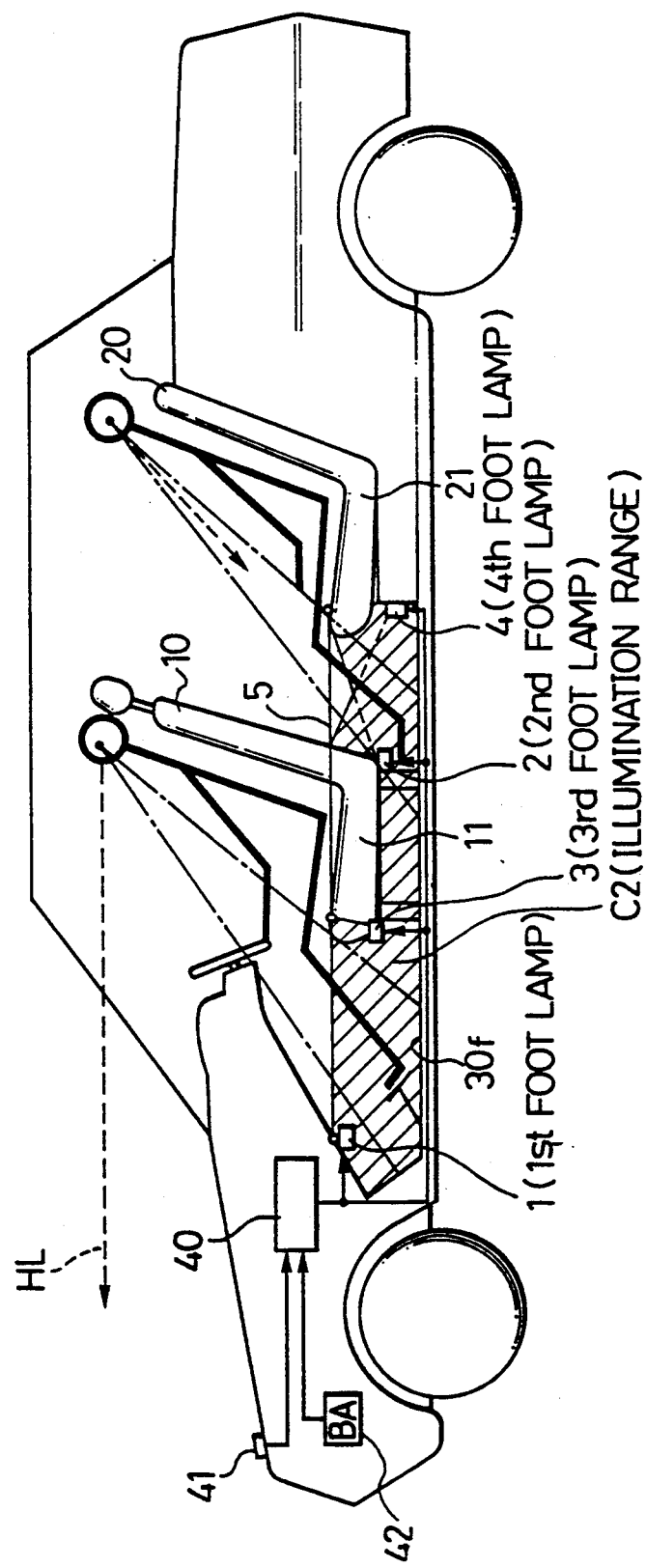

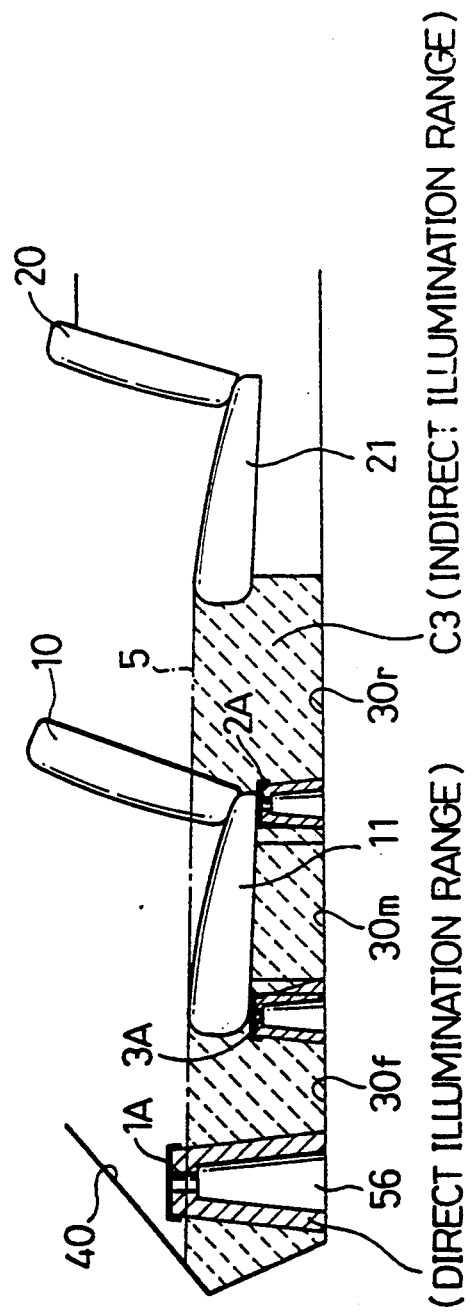

VEHICLE ROOM FLOOR ILLUMINATING APPARATUS

BACKGROUND OF THE INVENTION

1. Field of the Invention

The present invention relates generally to a vehicle room floor illuminating apparatus, and more specifically to a vehicle room floor illuminating apparatus for illuminating only the vehicle room floor of a passenger car, for instance.

2. Description of the Prior Art

In the conventional automotive vehicles, since the vehicle room is illuminated by only a room lamp attached to ceiling of the vehicle room, the illumination light is not broadly transmitted to all of the vehicle room floor or to all of the corners within the vehicle room, because the illumination light is intercepted by vehicle seats or passengers. Therefore, there exists a problem in that the space near passenger's feet is usually dark, and, therefore, the passenger feels that the vehicle room space is narrower than it is.

The above-mentioned problems can be explained as follows: First, when the vehicle room is dark near the passenger's feet, the passenger's eyes naturally see the brightest position near their eyes (e.g. the room light), so that the passenger feels that the vehicle room is narrow. Secondly, when the vehicle is running along a bright street, since the passenger's eyes are adapted to the external bright environment (light adaptation) and therefore the eyes' sensitivity decrease, the passenger feels the position near the passenger's feet to be darker than it is. Thirdly, when the vehicle room is illuminated directly by another room lamp, since shadows of the seats or the passengers are inevitably produced on a vehicle room floor, the vehicle room floor will not be illuminated broadly and uniformly.

In the conventional vehicle room illuminating apparatus, as described above, there exist problems in that the passenger feels the vehicle room floor to be dark and therefore the vehicle room space to be narrower, and also feels uneasy. Additionally, a passenger cannot easily pick up an object on the room floor.

The further detail of the above-mentioned problems in connection with illumination and illumination method under due consideration of human eyes is described in "LIGHTING HANDBOOK", edited by ILLUMINATING ENGINEERING INSTITUTE OF JAPAN, which is incorporated herein by reference.

SUMMARY OF THE INVENTION

With these problems in mind, therefore, it is the primary object of the present invention to provide a vehicle room illuminating apparatus for illuminating only the vehicle room or only a lower room space in such a way that the passenger feels that the vehicle room is bright, broad and easy, while reducing the passengers' eye fatigue.

To achieve the above-mentioned object, a vehicle, is room floor illuminating apparatus according to the present invention, for an automotive vehicle provided with at least one front seat arranged in a vehicle room, comprising: (a) power supplying means; and (b) at least one first foot lamp means connected to said power supplying means, for illuminating a lower room space roughly at a level below a seat cushion of the front seat in the vehicle room. The first foot lamp means illuminates the lower room space roughly below an uppermost position of the front seat cushion brighter than an upper room space above the same uppermost position of the front seat cushion illuminated by another lamp at least within a visual field of a passenger taking the front seat.

The first foot lamp means is mounted in a first foot lamp range A defined between uppermost and lowermost positions of the front seat cushion in height and between a lower surface of an instrument panel and a frontmost end of the front seat cushion in longitudinal length, when seen from side of a vehicle. Further, the first foot lamp means is mounted in the first foot lamp range A, respectively on both right and left sides of the vehicle room, when seen from top of the vehicle.

In the first embodiment, said first foot lamp means is attached on the lower surface of the instrument panel at a height roughly the same as that of the uppermost position of the front seat cushion in such a way as to illuminate a front floor before the front seat and a middle floor under the front seat.

The apparatus further comprises at least one second foot lamp means also connected to said power supplying means, for illuminating a space under the front seat cushion additionally and a lower space roughly below a seat cushion of a rear seat arranged in the vehicle room. The at least one second foot lamp means illuminates the lower room space roughly below an uppermost position of the rear seat cushion brighter than an upper room space above the same uppermost position of the rear seat cushion illuminated by another room lamp at least within a visual field of a passenger taking the rear seat.

The second foot lamp means is mounted in a second foot lamp range B defined between a lowermost position of the rear seat and a rear floor in height and between a rearmost end of the front seat cushion and a frontmost end of the rear seat cushion in longitudinal length, when seen from side of a vehicle. Further, the second foot lamp means is mounted in the second foot lamp range B, respectively on both right and left side of the vehicle room, when seen from top of the vehicle.

In the first embodiment, said second foot lamp means is mounted at a rearmost and lowermost position of the front seat cushion in such a way as to illuminate a middle floor under the front seat and a rear floor before the rear seat.

The apparatus further comprises a third foot lamp mounted in the first foot lamp range A, for additionally illuminating a front floor before the front seat and a middle floor under the front seat. In the second embodiment, said third foot lamp is further mounted at a frontmost and lowermost position of the front seat cushion.

The apparatus further comprises a fourth foot lamp mounted in the second foot lamp range B, for additionally illuminating a middle floor under the front seat cushion and a rear floor before the rear seat cushion. In the second embodiment, said fourth foot lamp is further mounted near a front and lower end of the rear seat cushion.

The foot lamp is mounted on the vehicle floor and provided with a shader for shading lamp light so that light is emitted substantially in a horizontal direction, a predetermined small elevation angle direction, or a vertically downward direction. Alternately, the foot lamp is supported by a lamp post stood upright on the vehicle floor.

Further, it is preferable that the apparatus comprises: (a) optical sensor means for detecting external brightness of the vehicle; and (b) control means responsive to said optical sensor means and connected between said power supplying means and said at least one lamp means, for adjusting brightness of said foot lamp means on the basis of the detected external brightness in such a way that the brightness of said foot lamp means increases with increasing external brightness and decreases with decreasing external brightness.

The control means controls the brightness of said foot lamp into a plurality of different grades according to the external brightness detected from the vehicle, and further adjusts brightness of at least one second lamp means for illuminating a space under the front seat cushion additionally and a lower space below a rear seat cushion, in such a way that luminance on a front floor is about three times higher than that on a rear floor within a vehicle room.

In the vehicle room floor illuminating apparatus according to the present invention, since only a lower room space below the seat cushion can be illuminated brighter than the upper room space, there exist various advantages at night or in the evening as follows:

(a) Since the passenger's eyes usually see positions near the room floor the farthest away from their eyes, he feels that the vehicle room is broad and at ease.

(b) Since the passenger's eyes usually see positions near the relatively dark floor, without seeing the front remote bright road surface, the passenger's eyes are adapted to the moderately illuminated passenger's feet, so that the passenger can well see objects within the vehicle room or easily pickup an object on the floor. In this case, since the solid angle of the passenger's visual field angle to the illuminated room floor is relatively small, the passenger's eyes are not excessively adapted to the illuminated room floor. In other words, since the passenger's eyes see the relatively remote and narrow room floor within the vehicle room, the passenger can feel at ease.

(c) Since the middle floor under the front seat cushion is also illuminated by the first and the second foot lamps, it is possible to minimize the occurrence of shadows of objects placed on the floor.

(d) Since the brightness of the foot lamps can be adjusted according to the external optical intensity detected from the vehicle, it is possible to further allow the passenger to well see objects within the vehicle room under due consideration of the human eyes' light and dark adaptation.

BRIEF DESCRIPTION OF THE DRAWINGS

FIG. 2 is a diagrammatic illustration showing a first embodiment of the vehicle room floor illuminating apparatus according to the present invention;

FIG. 3 is a similar diagrammatic illustration showing a second embodiment of the vehicle room floor illuminating apparatus according to the present invention;

FIG. 4 is a diagrammatic illustration showing a third embodiment of the vehicle room floor illuminating apparatus according to the present invention.

DETAILED DESCRIPTION OF THE PREFERRED EMBODIMENTS

The embodiments of the vehicle room floor illuminating apparatus according to the present invention will be explained hereinbelow with reference to the attached drawings.

Figure 1:
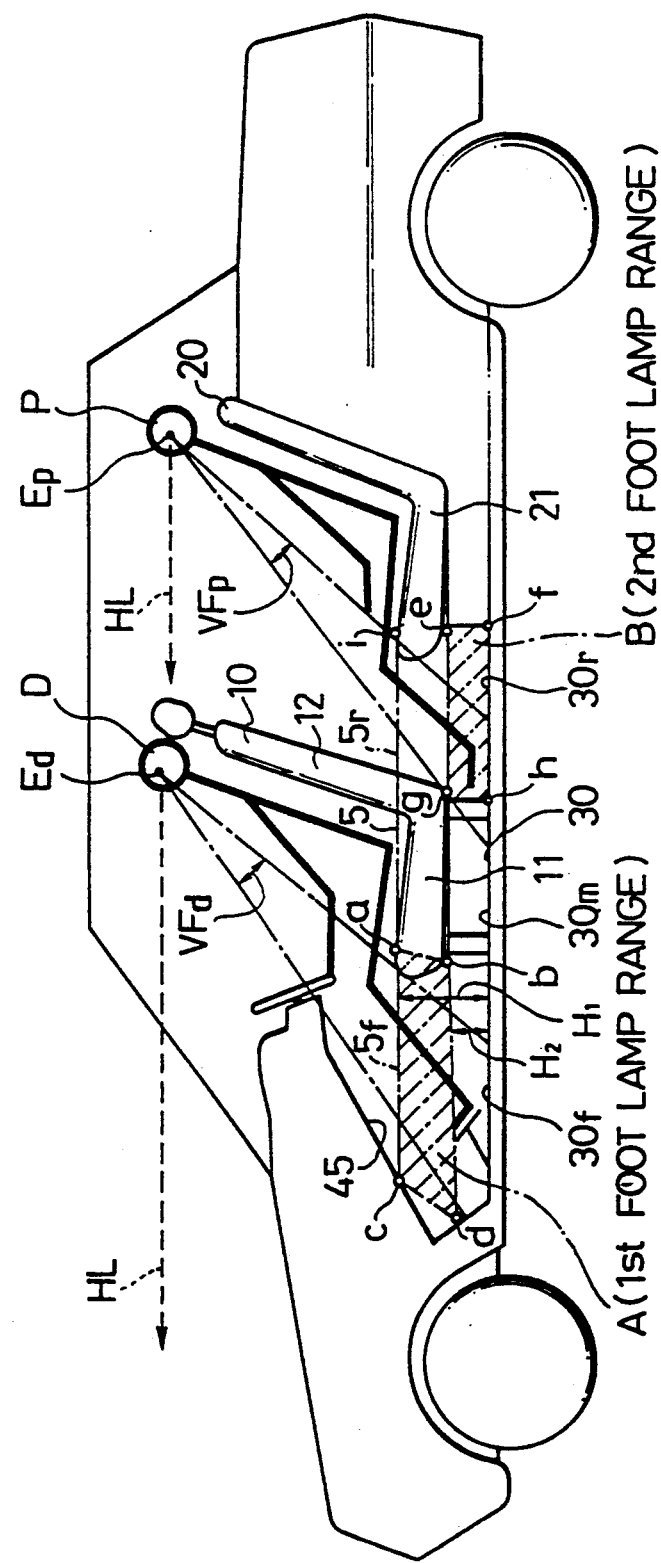
FIG. 1 is a diagrammatic illustration for assistance in explaining first and second foot lamp mounting ranges A and B according to the present invention.

FIG. 1 shows a basic embodiment thereof, in which at least one first foot lamp is disposed within a first foot lamp mounting range A as defined by four points a, b, c and d, when the vehicle room left side is seen from the side of the vehicle, as depicted by dot-dashed line hatched range A in FIG. 1. The point corresponds to an uppermost position of a seat cushion 11 of a front seat 10 (a distance $H_1$ high from the floor 30); the point b corresponds to a lowermost position of the seat cushion 11 of the front seat 10 (a distance $H_2$ high from the floor 30); the point c corresponds an upper surface position of an instrument panel 45 (a distance $H_1$ high from the floor 30); and the point d corresponds to a lower surface position of the instrument panel 45 (a distance $H_2$ high from the floor 30). The at least one first foot lamp is disposed within this first lamp mounting range A and directed toward the front seat cushion 11 so as to illuminate only a lower room space below a line $5_f$ connected between the two points a and c and a front floor $30_f$ before the front seat 10 and a space under the front seat cushion 11.

Further, in a usual console box (not shown) is disposed at the front middle portion of the vehicle room, the at least one first foot lamp is disposed on both the right and left front sides, respectively when the vehicle room is seen from above.

Therefore, when a driver D taking the front seat 10 sees the front floor $30_f$ within a visual field angle $VF_d$ of eyes $E_d$ of the driver D, the driver D feels that the lower room space below the line $5_f$ is brighter than the upper room space above the same lien $5_s$ at least within the visual fields of the driver D taking the front seat 10.

In addition, it is preferable that at least one second foot lamp is disposed within a second foot lamp mounting range B as defined by four points e, f, g and h, when the vehicle room left side is seen from the side of the vehicle, as depicted by dot-dashed line hatched range B in FIG. 1. The point e corresponds to a lowermost position of a seat cushion 21 of a rear set 20 (a distance $H_1$ high from the floor 30); the point f corresponds to a position on a rear floor $30_r$ just below the point e; the point g corresponds to a lowermost position of seat back 12 (or a rearmost position of the seat cushion 11) of the front seat 10; and the point h corresponds to a position on a middle or rear floor $30_m$ or $30_r$ just below the point g. The at least one second foot lamp is disposed within this second lamp mounting range B and directed toward under the front seat cushion 11 and the rear seat cushion 21 so as to illuminate only a lower room space below a line $5_r$ connected between the two points and i (the uppermost position of the seat cushion 21 of the rear seat 20) and a rear floor $30_r$ before the rear seat 20 and the space under the front seat cushion 11.

Further, a longitudinal projection is often disposed at the rear middle portion of the vehicle room for accommodating a propeller shaft thereunder, the at least one second foot lamp is disposed on both the right and left rear sides, respectively when the vehicle room is seen from above.

Therefore, when the passenger P taking a rear seat 20 sees the rear floor $30_r$ within a visual field angle $VF_p$ of eyes $E_p$ of the passenger P, the passenger P feels that the lower room space below the line $5_r$ is brighter than the upper room space above the same line $5_r$ at least within the visual field of the passenger P taking the rear seat 20.

The foot lamps disposed within the above two mounting ranges A and B are each composed of a lamp and a reflector or a shader so that the light emitted from the lamp illuminates the space below the line 5 connecting between the two uppermost positions a and i of the front and rear 30 seat cushions 11 and 21 (a distance $H_1$ high from the floor 30).

FIG. 2 shows a first embodiment of the illumination apparatus of the present invention, in which a first foot lamp 1 is attached on the lower surface of an instrument panel 45 and a second foot lamp 2 is disposed under the rearmost end of the front seat cushion 11 in order to illuminate the lower space as depicted by the solid-line hatched range $C_1$. These two foot lamps 1 and 2 are connected to a controller 40 to which an optical sensor 41 and a battery 42 are connected. The optical sensor 41 detects the external brightness, and outputs signals corresponding to the detected external brightness to the controller 40. The controller 40 classifies the sensor signals into two (high and low) ranges, for instance. When the vehicle is running along a bright street or an illuminated tunnel at night, the sensor 41 generates a bright signal to the controller 40 to determine the brightness of the two foot lamps 1 and 2 in such a way that the brightness on the front floor $30_f$ lies within a range from 0.01 to 0.05 (cd/m$^2$) when the driver D taking the front seat 10 sees the front floor $30_f$ within the visual field angle $VF_d$ and that on the rear floor $30_r$ is about 0.003 (cd/m$^2$) when the passenger P taking the rear seat 20 sees the rear floor $30_r$ within the visual field angle $VF_p$. Further, when the vehicle is running along a dark street at night, the sensor 41 generates a dark signal to the controller 40 to determine the brightness of the two foot lamps 1 and 2 in such a way that the brightness on the front floor $30_f$ lies within a range from 0.004 to 0.02 (cd/m$^2$) and that on the rear floor $30_r$ is about 0.001 (cd/m$^2$). However, the luminance on the front and rear floor $30_f$ and $30_r$ changes according to the reflectivity of the carpet spread on the floor 30, even if the brightness on the floor is set constant.

Further, in the above first embodiment, the maximum brightness at the vehicle room floor 30 is determined to be 2.0 (cd/m$^2$) or less and the minimum illuminance at the floor 30 is determined 1 (1×) or more, when the driver D taking the front seat 10 and the passenger P taking the rear seat 20 see the floor within the visual field angles $VF_d$ or $VF_p$ of the eyes $E_d$ or $E_p$. Further, it is also possible to adjust the brightness of any one of the first and second foot lamps 1 and 2, separately.

Various experiments have indicated the following facts: In bright external environment, since the maximum road surface brightness determined by the JAPANESE ROAD ILLUMINATION STANDARD is about 2.0 (cd/m$^2$) and the driver D taking the front seat 10 is adapted to the bright external environment, the preferable brightness on the front floor $30_f$ is about 0.2 or less (cd/m$^2$). On the other hand, since the passenger P taking the rear seat 20 does not see the front bright road surface as compared with the driver D and therefore is adapted to relatively dark environment, the preferable brightness on the rear floor $30_r$ is much (e.g. $\frac{1}{8}$ times) lower than that on the front floor $30_f$.

On the other hand, in dark external environment, since the driver D taking the front seat 10 is adapted to the headlamp brightness on the front road surface, the preferable brightness on the front floor $30_f$ is about 0.02 or less (cd/m$^2$). On the other hand, since the passenger P taking the rear seat 20 does not see the front road surface and therefore is adapted to more dark environment, the preferable brightness on the rear floor $30_r$ is much (e.g. $\frac{1}{4}$ times) lower than that on the front floor $30_f$.

Further, it is preferable to increase the brightness on the room floor 30 in light environment by about 3 times higher than that on the room floor 30 in dark environment, in order to allow the driver and the passengers to see an object within the vehicle room at roughly the same brightness level, without being subjected to the influence of change in eyes' dark and light adaptation.

Further, it is also possible to automatically adjust the brightness of the first and second foot lamps 1 and 2 into three (high, medium and low) different levels or to switch any one of the two foot lamps 1 and 2 into two (high and low) levels. Further, it is also possible to manually and finely adjust the brightness of the first and second foot lamps 1 and 2, separately or simultaneously, continuously in analog fashion.

Further, it is also possible to determine the brightness of the two foot lamps 1 and 2 on the basis of the external brightness on the front road surface as follows: the illuminance on the floor is adjusted to about 20 (1×) when the average external road surface brightness EB for one minute is $0<EB\leq0.5$ (cd/m$^2$); 40 (1×) when $0.5<EB\leq0.7$ (cd/m$^2$); 70 (1×) when $0.7<EB\leq1.0$ (cd/m$^2$); 110 (1×) when $1.0<EB\leq2.0$ (cd/m$^2$); and 160 (1×) when $2.0<EB$ (cd/m$^2$). Further, it is also possible to increase the illuminance on the floor 160 (1×) or more, only when the floor is required to be more brightly. Further, it is also possible to increase the illuminance only on the rear floor $30_r$ without exerting a harmful influence to the driver D.

The effect of the first embodiment shown in FIG. 2 will be described in detail hereinbelow. In the floor illuminating apparatus according to the present invention, only the lower space below the line 5 connecting the two uppermost points a and i of the two seat cushions 11 and 21 of the two front and rear seats 10 and 20, or only the vehicle floor 30 is illuminated by the first and second foot lamps 1 and 2. In other words, since the upper space above the seat cushion (e.g. above the passenger's knee or near the passenger's eyes) is illuminated dark and the lower space below the seat cushion (e.g. the passenger's feet remote from the passenger's eyes) is illuminated bright, it is possible to allow the passenger to see a bright floor remote from the passenger's eyes and therefore to feel psychologically that the vehicle room is broad.

In more detail, when the human eyes see a small object, the lens function of the eyes are so adjusted that the small object is focused on a central fossa where a great number of conical cells are concentrated on the retina, in order to discriminate the shape and the color of the object for recognition. Here, it has been known that the sensitivity of these conical cells is relatively low and therefore reacts only to a bright object. For instance, the conical cells react to an object with 0.001 (cd/m$^2$) or more brightness under a relatively dark background. However, the sensitivity of these conical cells decreases with increasing brightness in the environment, so that the conical cells react only to a bright object. In other words, it has been known that human eyes usually tend to see a brighter object and further to be moved toward a brighter object or toward a broader brighter area in a dark environment. Therefore, when there exists a bright area near the passenger's eyes, since the passenger tends to see the bright and near area, he feels that the vehicle room is narrower than is actual. In the present invention, however, since the floor 30 the farthest away from the passenger's eyes is illuminated bright and therefore the passenger tends to see the bright floor 30, it is possible to allow the passenger to feel that the vehicle room is relatively broader. On the other hand, since the bright floor 30 is relatively narrow and therefore the visual field angle $VF_d$ or $VF_p$ is small, it is possible to prevent the passenger's eyes from seeing only on the floor; that is, to allow the passenger's eyes to see all over the vehicle room, thus permitting the passenger to feel a special spread. In addition, since there exists no specially bright positions, the passenger's eyes are not fixed to a fixed position, thus allowing the passenger to feel at ease. In the same way as with the case of the general room illumination in a house, the preferable illumination condition is to avoid an extreme difference in brightness between positions within the same room.

Further, when some positions are illuminated bright within the vehicle room, since the driver's eyes tend to see the bright positions and therefore often to be moved between the far front road surface and the near bright positions, the driver's eyes become tired. In the present invention, however, since only the lower space below the instrument panel is illuminated bright, it is possible to prevent the above-mentioned movement of the driver's eyes.

Further, since the floor or the passenger's feet are moderately illuminated bright as compared with the upper space within the same vehicle room, the driver D and the passenger P can well discriminate the shape and color of an object on the floor under the condition that their eyes are well adapted to the brightness in the vehicle room, and therefore the passenger can feel a broad vehicle room and well recognize the presence or absence of an object within the vehicle room.

Further, the human eyes tend to see a brighter position. Therefore, conventionally, the passenger usually sees only the outside road surface of the vehicle along the horizontal line HL (shown in FIG. 1). This is because the brightness within the vehicle room is uniform and even. In the present invention, however, it is possible to allow the passenger to see various directions other than the horizontal direction HL.

Further, in the present invention, since the first and second foot lamps 1 and 2 are disposed on the floor, it is possible to prevent the passenger's shadow from being moved whenever the passenger moves within the vehicle room, being different from the case where these lamps are attached to higher positions such as the ceiling. Further, since the two foot lamps 1 and 2 are composed of a lamp and a reflector or a shader, and arranged in such a way that only the lower space below the line 5 (the seat cushions 11 and 21) can be directly illuminated, these foot lamps 1 and 2 will not directly illuminate the eyes of the driver D or the passengers P, so that the driver D and the passengers P are not dazzled and therefore can well see another farther and brighter position (e.g. the front road surface) where necessary.

Further, since the first foot lamp 1 illuminates the front floor $30_f$ and the middle floor $30_m$ under the front seat cushion 11 and the second foot lamp 2 illuminates the middle floor $30_m$ and the rear floor $30_r$, it is possible to prevent the shadows of passengers feet and an object on the floor 30 when seen from the passenger's eyes $E_p$, so that it is possible to easily pick up an object fallen or placed on the floor 30. Further, since no shadow is produced, it is possible to provide an easy environment to the passengers. Further, in this first embodiment, since a first foot lamp 1 is disposed near almost the farthest point from the driver's eyes $E_d$ and the second foot lamp 2 is also disposed near almost the farthest point from the passenger's eyes $E_p$, it is possible to allow the driver's or passenger's eyes to see the farthest point within the vehicle room, so that they can sense the broader vehicle room.

Further, since the second foot lamp 2 is attached to the rearmost end of the seat cushion 11, even if the front seat is moved front and back, it is possible to uniformly illuminate the vehicle floor 30 in the same way.

In addition, in the apparatus according to the present invention, the brightness of the two foot lamps 1 and 2 is so adjusted that the brightness is about 0.01 to 0.05 ($cd/m^2$) on the front floor $30_f$ and about 0.003 ($cd/m^2$) on the rear floor $30_r$ on an average (when the external brightness is high); and about 0.004 to 0.02 ($cd/m^2$) on the front floor $30_f$ and about 0.001 ($cd/m^2$) on an average when the external brightness is low. Therefore, the driver D or the passenger P can distinguish the shape and the color of an object on the floor 30, under due consideration of human eyes' light and dark adaptation to external brightness, without being subjected to the influence of change in external brightness.

FIG. 3 shows a second embodiment of the present invention, in which a third foot lamp 3 is additionally attached to the frontmost lower portion of the seat cushion 11 of the front seat 10 and further a fourth foot lamp 4 is additionally attached to under the frontmost lower portion of the seat cushion 21 of the rear seat 20 in order to illuminate the lower space as depicted by the solid-line hatched range C2. The third foot lamp 3 illuminates the front floor $30_f$ before the front seat 10 and the middle floor $30_m$ under the front seat cushion 11, and the fourth foot lamp 4 illuminates the middle floor $30_m$ under the front seat cushion 11 and the rear floor $30_r$ before the rear seat 20. In the same way as in the first embodiment, the third and fourth foot lamps 3 and 4 illuminate the lower space below the line 5 connecting between the two uppermost positions of the front and rear seat cushions 11 and 21. Further, the brightness of each of these four foot lamps 1 to 4 is controlled in response to the external brightness detected by the sensor 41 and the controller 40.

In this second embodiment, since the four foot lamps 1 to 4 are arranged near the room floor 30, it is possible to further securely eliminate shadows of objects on the room floor 30, so that it is possible to easily pick up an object under the front seat cushion 11. Further, since the second and third foot lamps 2 and 3 are attached to the lower part of the seat cushion 11, it is also possible to obtain the same effect even when the front seat 10 is moved back and forth.

FIG. 4 shows a third embodiment of the present invention, in which a first pole foot lamp 1A is disposed in front of the front seat cushion 11 to illuminate in front floor $30_f$; a second pole foot lamp 2A is disposed at the rearmost position under the front seat cushion 11 to illuminate the middle and rear floor 30$_m$ and 30$_r$; and a third pole foot lamp 3A is disposed at the frontmost position under the front seat cushion 11 to illuminate the front and middle floor 30$_f$ and 30$_m$.

In this third embodiment, it is possible to directly illuminate the spaces (solid-line hatched portions) just under and around the three pole foot lamps 1A, 2A and 3A and indirectly illuminate the lower space C3 (dashed-line hatched portion) below the seat cushions 11 and 21. In this embodiment, therefore, it is possible to reduce the floor areas where the illumination intensity is high, so that the driver or the passenger can feel the broader vehicle room and therefore be more at ease. Further, since the light emitted from these post foot lamps 1A, 2A and 3A are reflected from the floor and indirectly illuminate objects within the vehicle room, it is possible to effectively eliminate shadows of objects within the vehicle room, so that the passenger can easily look for and picks up objects on the floor.

In this third embodiment, it is possible to eliminate any one of the second and third pole foot lamps 2A and 3A and to attach the one pole foot lamp at the middle portion of the middle floor 30$_m$ under the seat cushion 11.

Figure 5A:
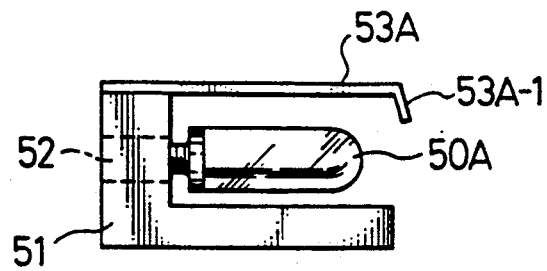
FIGS. 5(A) to (E) are diagrammatic side views for assistance in explaining various foot lamps used for the apparatus according to the present invention.
Figure 5B:
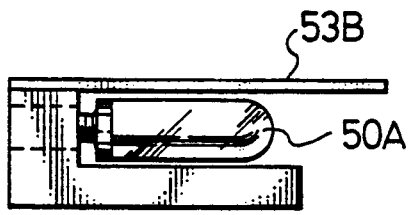
Figure 5C:
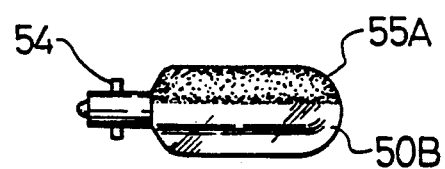
Figure 5D:
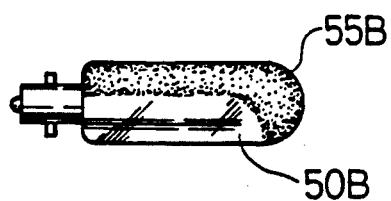
Figure 5E:
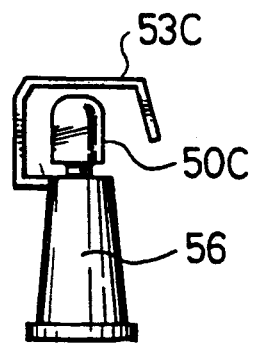

FIGS. 5(A) to 5(E) show various examples of the foot lamps. In FIG. 5(A), a lamp bulb 50A is screwed into a lamp socket 52 attached to a lamp holder (5). Further, a lamp shader 53A having an angled end 53A-1 is fixed to the lamp holder 51. In FIG. 5(B), the lamp bulb 50A is shaded by a long straight shader 53B. By adjusting the dimensions of these shaders, it is possible to allow lamp light beam to be emitted roughly in the horizontal direction, in a predetermined small elevation angle direction, or in a vertically downward direction. In FIG. 5(C) a lamp bulb 50B is partially covered by a semicylindrical metallic coated cover 55A formed on the inside or outside the lamp bulb. In the same way, in FIG. 5(D), a lamp bulb 50B is partially covered by a semicylindrical and semispherical metallic coated cover 55B. By adjusting the dimensions of these metallic coated covers, it is also possible to determine the direction of the light beam emitted from the lamp 50B. Further, in this type of the lamp 50B, two bulb angular position locating pins 54 are provided to engage the lamp with a lamp socket so that the metallic coated cover 55B is located correctly upward relative to the socket 52 or the lamp holder 51. FIG. 5(E) shows an example of post foot lamp 50C used for the third embodiment shown in FIG. 4, in which a lamp bulb 50C is inserted into a socket supported by a lamp post 56 and shaded by a roughly U-shaped shader 53C to emit light mainly in the downward direction.

Further, it is also possible to allow the light beam to be emitted in a predetermined direction by another element or parts already provided within the vehicle room, for instance such as, vehicle door, seat cushion, etc., without use of the shader and the coated cover.

As described above, in the vehicle room floor illuminating apparatus according to the present invention, since only the vehicle floor or only the lower space below the seat cushions can be illuminated a little brighter than the upper space above the seat cushion, the driver's or passenger's eyes usually see the floor the farthest away from their eyes. Therefore, it is possible to allow the passengers to feel the broad vehicle room and be at ease without allowing the passenger's eyes to tire by direct illumination, to facilitate picking-up of an object on the floor, to eliminate the shadows of movable objects within the vehicle room, and to maintain the above-mentioned effect even when the front seat is moved back and forth, because the second and third foot lamps 2 and 3 are attached to the lower part of the front seat cushion 11.

Further, the brightness of each of the foot lamps can be adjusted according to the external brightness condition, it is possible to illuminate the vehicle floor under due consideration of a human's light and dark adaptation, so that the driver and passengers can see an object within the vehicle room at roughly a constant sensitivity level.

What is claimed is:

1. A vehicle floor illuminating apparatus provided with at least one front seat arranged in a vehicle room, comprising:
    (a) power supplying means;
    (b) at least one first foot lamp means connected to said power supplying means, for illuminating only a selected lower room space roughly below a seat cushion of the front seat in the vehicle room, said first foot lamp means being mounted in a first foot lamp range A, range A being defined by imaginary lines between uppermost and lowermost forward ends of the front seat cushion in height and between a lower surface of an instrument panel and a frontmost end of the front seat cushion in length, when seen from the side of the vehicle; and
    (c) a second foot lamp mounted in the first foot lamp range A, for illuminating a front floor before the front seat and a middle floor under the front seat.

2. The vehicle room floor illuminating apparatus of claim 1, wherein said second foot lamp is mounted at a frontmost, lowermost position of the front seat cushion.

3. A vehicle floor illuminating apparatus provided with at least one front seat arranged in a vehicle room, comprising:
    (a) power supplying means;
    (b) at least one first foot lamp means connected to said power supplying means, for illuminating only a selected lower room space roughly located below a seat cushion of the front seat in the vehicle room;
    (c) at least one second foot lamp means also connected to said power supplying means, for illuminating a room space located under the front seat cushion and a lower space located roughly below a seat cushion of a rear seat in the vehicle room, said second foot lamp means being mounted in a second foot lamp range B, range B being defined by imaginary lines between a lowermost position of the rear seat and a rear floor in height and between a rearmost end of the front seat cushion and a frontmost end of the rear seat cushion in length, when seen from the side of the vehicle; and
    (d) a third foot lamp mounted in the second foot lamp range B, for illuminating a middle floor located under the front seat cushion and a rear floor before the rear seat cushion.

4. The vehicle room floor illuminating apparatus of claim 3, wherein said third foot lamp is mounted near a front, lower end of the rear cushion.

5. A vehicle floor illuminating apparatus provided with at least one front seat arranged in a vehicle room, comprising:
    (a) power supplying means;
    (b) at least one first foot lamp means connected to said power supplying means, for illuminating only a selected lower room space roughly below a seat cushion of the front seat in the vehicle room;

(c) optical sensor means for detecting the external brightness outside of the vehicle; and (d) control means responsive to said optical sensor means and connected between said power supplying means and said lamp means, for adjusting the brightness of said foot lamp means on the basis of the detected external brightness in such a way that the brightness of said lamp mans increases with increasing external brightness and decreases with deceasing external brightness.

6. The vehicle floor illuminating apparatus of claim 5, wherein said control means controls the brightness of said foot lamp means by providing a plurality of different brightnesses selected according to the external brightness detected from the vehicle.

7. The vehicle floor illuminating apparatus of claim 5, wherein said control means further adjusts the brightness of at least one second lamp means for illuminating a room space under the front seat cushion and further illuminates a lower space below a rear seat cushion, the luminous intensity on the front floor being about three times greater than that on the rear floor within the vehicle room.

* * * * *